United States Patent [19]

Davis, Jr.

[11] 4,136,596
[45] Jan. 30, 1979

[54] LOCKBOLT COLLAR
[75] Inventor: Samuel B. Davis, Jr., New Galilee, Pa.
[73] Assignee: Textron Inc., Providence, R.I.
[21] Appl. No.: 825,262
[22] Filed: Aug. 17, 1977
[51] Int. Cl.² ............................................. F16B 19/05
[52] U.S. Cl. ............................................ 85/7; 403/408
[58] Field of Search .................. 151/2 R, 2 A; 85/72, 85/32 R, 7, 5 R, 1 R; 29/517, 508; 403/408

[56] References Cited
U.S. PATENT DOCUMENTS

| 2,804,798 | 9/1957 | Brilmyer | 85/5 R |
| 2,978,946 | 4/1961 | Looker | 85/5 R |
| 3,057,246 | 10/1962 | Brilmyer | 85/5 R |
| 3,094,017 | 6/1963 | Champoux et al. | 85/5 R |
| 3,236,143 | 2/1966 | Wing | 85/72 X |
| 3,262,353 | 7/1966 | Waeltz et al. | 85/72 |

Primary Examiner—Rodney H. Bonck
Attorney, Agent, or Firm—Webb, Burden, Robinson & Webb

[57] ABSTRACT

The improved lockbolt collar comprises a substantially cylindrical first section and an outwardly flaring skirt connected to the cylindrical section. During the initial setting operation, the cylindrical portion of the collar is swaged into engagement with appropriate locking grooves on a lockbolt pin. In a second setting operation, the skirt is deformed inwardly so as to engage the locking grooves. As a result of the angular relationship of the skirt to the cylindrical section, the second setting step has the effect of elongating the collar to form a tightened joint.

3 Claims, 6 Drawing Figures

LOCKBOLT COLLAR

FIELD OF THE INVENTION

My invention relates to swageable collars for attachment to a bolt having locking grooves and, more particularly, to a swageable lockbolt collar for use with a standard lockbolt and the like.

DESCRIPTION OF THE PRIOR ART

The standard lockbolt collar is basically a cylindrical section of swageable metal which may or may not have a chamfered inner surface at one end for ease of placement on a lockbolt or other fastening pin having locking grooves. The standard collar is positioned on the lockbolt with the workpieces positioned between the preformed lockbolt head and the collar. A tensile force is applied to the pin tail of the lockbolt as the setting tool exerts an opposing force on the lockbolt collar to swage the collar into interlocking engagement with locking grooves along the shank of the lockbolt. Thereafter, the continued application of the setting tool breaks the pin tail of the lockbolt at the weakened breaknotch groove adjacent the end of the collar.

The joint formed by the attachment of the collar to the lockbolt is permanent and does not permit for further adjustment. Where an excessive expanse of material is being joined or where the material being joined is warped or otherwise presents a gap therebetween, the standard lockbolt and collar attachment cannot be successfully employed. For example, where a long metal panel is being attached to a support member, standard nuts and bolts are generally employed since by the time the last connection has been made, the initial connections have become loose and must be retightened.

In some installations where workpiece gaps or joint loosening is a problem, temporary fasteners such as fit-up bolts are used to hold the workpieces to be joined tightly together. A representative fit-up bolt has a clear through slot through which is placed a wedge which then forces the workpieces together as the wedge is being driven into the slot. The fit-up bolt is removed after the plurality of fasteners is set and a tight joint has been assured.

Representative lockbolt collars are illustrated in U.S. Pat. Nos. 3,215,024; 2,531,049; 3,295,404 and 3,057,246.

Other types of deformable washers are illustrated in U.S. Pat. Nos. 4,012,828; 3,989,081 and 3,803,793.

It is an object of my invention to provide a lockbolt collar which can be deformed in such a way so as to provide a secondary clinch to avoid a loose connection.

It is further an object of my invention to provide a deformable collar which eliminates the need for fit-up bolts or the like in connections involving long expanses of workpieces.

It is another object of my invention to provide a deformable collar which will provide a connection having a comparable ultimate tension to a standard bolt and nut.

SUMMARY OF THE INVENTION

My invention is a swageable lockbolt collar having an interior defined by a substantially cylindrical first section and an outwardly flaring skirt connected to the cylindrical section. The flaring skirt is of such an axial extent and angular relationship to the cylindrical section that it can be deformed in a second setting operation so as to effectively cause an elongation of the collar to tighten the parts being joined.

DESCRIPTION OF THE PREFERRED EMBODIMENTS

Figure 1:
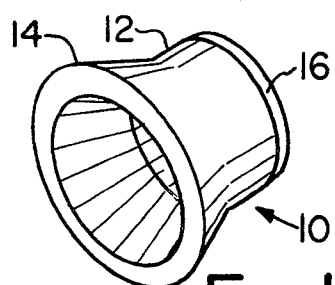
FIG. 1 is a perspective view of my collar.
Figure 2:
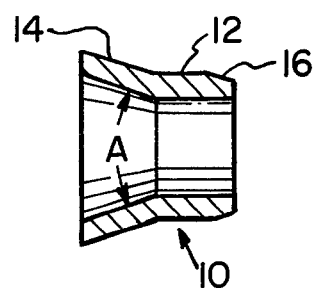
FIG. 2 is a vertical section through my collar.

My lockbolt collar, generally designated 10, comprises a first cylindrical section 12 and a flared skirt section 14 extending outwardly therefrom, FIGS. 1 and 2. The cylindrical section 12 may include a chamfer 16 at its distal end for ease in accommodating a setting tool. As will be explained in detail hereinafter, the effective amount of elongation of the deformable skirt section 14 will depend on the axial extent of the skirt 14 and the angle (designated A in FIG. 2) that the skirt 14 makes with the cylindrical section 12. A representative collar for a ⅝ inch lockbolt will have a skirt formed at an included angle of approximately 30° (angle A) to the cylindrical section and said skirt will have an axial extent approximately equal to that of the cylindrical section. The wall thicknesses of the cylindrical section 12 and the skirt section 14 are comparable.

The collar 10 is intended for use on a standard lockbolt or other pin type fastener having locking grooves. Such a lockbolt, generally designated 18, is provided with an integral, preformed head 20 adapted to engage one face of a workpiece, FIG. 3. The lockbolt 18 has a shank 22 which extends through the openings of adjacent workpieces 40 and 42 to be connected together. Shank 22 includes a plurality of annular grooves 24 onto which is swaged the collar 10. These grooves 24 are thusly referred to as locking grooves. Adjacent the locking grooves 24 along the shank 22 is a weakened area formed by a notched section of lesser diameter than the shank 22 and which is intended to cause breaking of the shank 22 at that point. This weakened area is referred to as the breakneck groove 26.

The remainder of the shank 22 includes a series of annular grooves or knurles which forms the gripping portion 28 of the lockbolt 18. This gripping portion is engaged by a setting tool (not shown) which exerts a tensile pull on the lockbolt 22 while at the same time a nosepiece or anvil is exerting an opposing force as it slides over the collar to deform it into interlocking engagement with the locking grooves 24. It will be understood by those skilled in the art that there are many other types and designs of lockbolts and setting pins which will accommodate a collar. The basic requirement is, of course, that the pin provides a series of locking grooves onto which the collar can be swaged.

Figure 3:
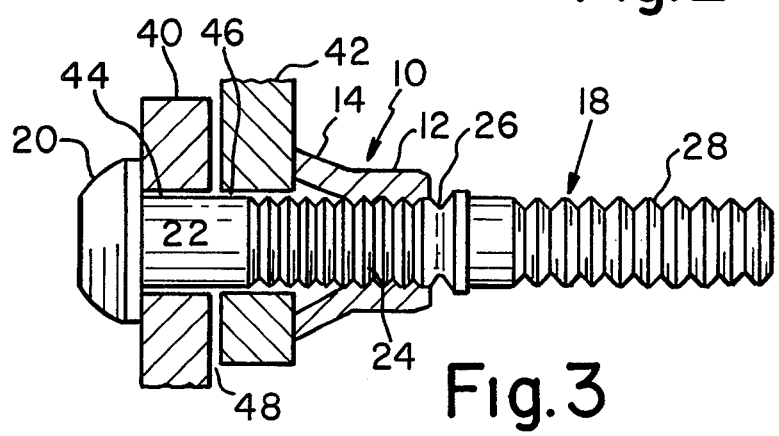
FIG. 3 illustrates the first stage setting of an assembly employing my collar.
Figure 4:
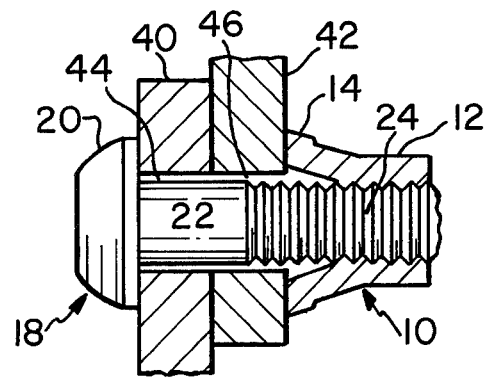
FIG. 4 illustrates the final setting step of the assembly of FIG. 3.

A representative assembly is illustrated in FIGS. 3 and 4. Lockbolt 18 is inserted through holes 44 and 46 of workpieces 40 and 42, respectively, so that the preformed head 20 abuts against workpiece 40. Thereafter, collar 10 is inserted over shank 22 until it rests against workpiece 42. An installation gun (not shown) is inserted over the lockbolt 18 so as to engage gripping section 28 in gripping jaws while at the same time positioning the nosepiece or anvil against cylindrical section 12 of collar 10. As the fastening tool is activated, the shank is pulled in tension while the nosepiece frictionally slides over cylindrical section 12 causing the metal of cylindrical section 12 to flow inwardly so as to swage the cylindrical section to the locking grooves 24 of the lockbolt 18.

The resistive force exerted during this initial operation is not sufficient to break off the pin tail or gripping portion 28 at the breakneck groove 26. This can be controlled in one of several ways. For example, the operator can visually see when the anvil reaches the skirt 14, at which time the tension is released. Another manner known in the art would be the provision of a high-low valve for the fastening tool which in the low mode would not exert enough force to break the pin tail at the locking groove. In FIG. 3, a gap 48 is illustrated between the workpieces 40 and 42. This is the type of gap that could occur from warped workpieces or from a loosening condition caused by the attachment of a long workpiece. It will be noted that during the initial setting of the collar 10, the skirt section 14 is not deformed and merely abuts against the adjacent workpiece 42 while cylindrical section 12 has been swaged into locking engagement.

After a series of fasteners has been set, the worker returns to the initially set fasteners and again places the fastening tool over the pin tail and into engagement with the cylindrical section 12 which has previously been placed in swaging, interlocking relationship with the locking grooves 24 of lockbolt 18. During the second operation, the anvil continues to advance, this time beyond the cylindrical section 12 and onto the skirt section 14. This continued movement of the anvil forces the portions of the skirt 14 being engaged into interlocking engagement with additional locking grooves 24. This action continues until the workpieces 40 and 42 are tightly held between the lockbolt preformed head 20 and the collar 10 and sufficient resistance has built up to cause the pin tail to break at the breakneck groove 26, FIG. 4. This tightening is effected by the elongation of the skirt 14 in the axial direction.

Figure 6:
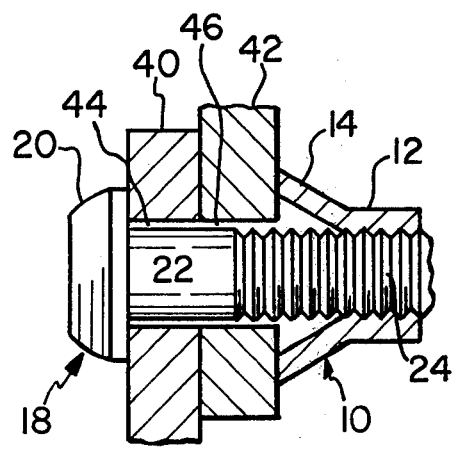
FIG. 6 illustrates my collar utilized in a connection of workpieces in which there was little if any gap therebetween.
Figure 5:
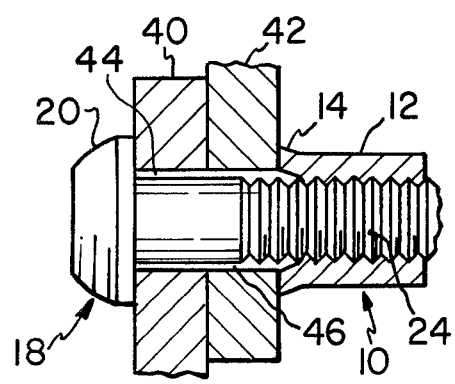
FIG. 5 illustrates my collar utilized in a connection of workpieces previously separated by a substantial gap.

The collar 10 actually self adjusts to the amount of gap that is left after the first setting operation, FIGS. 5 and 6. The connection of FIG. 5 shows the result of joining two workpieces 40 and 42 in which there was a substantial gap therebetween after the first setting operation. The anvil has effectively caused the elongation of skirt section 14 so that the final axial extent of cylindrical section 12 is increased and the final axial extent of skirt section 14 is decreased. As a practical matter and if the amount of gap warrants it, skirt section 14 can be elongated until it is entirely a cylindrical extension of cylindrical section 12.

On the other hand should there be no gap after the first setting operation, the skirt 14 remains substantially unaltered and the connection is held tight by the engagement of the cylindrical section 12 to the locking grooves 24, FIG. 6. In effect, the skirt section will have a very small section of its upper portion swaged onto the locking grooves as a result of the anvil pushing against the skirt while the resistive forces build up to cause the pin tail 28 to break at the breakneck groove 26.

It has been found that lockbolt collar 10 can provide a joint substantially equivalent to that of a nut and bolt when installed within workpieces having from no gap to reasonable gaps which do not exceed the elongation capability of the skirt section. The same size collar has been used on ⅝ inch lockbolts in which the workpieces had no gap, ¼ of an inch gap and ⅜ inch gap, respectively. In all cases a tight joint was formed with the only noticeable difference being the amount of skirt which was deformed and swaged into locking engagement with the locking grooves of the lockbolt. Push out tests on a ⅝ inch lockbolt set with a collar of the subject invention averaged approximately 26,000 pounds in ultimate tension as compared to 27,100 pounds for a standard nut and bolt in accordance with ASTM specification A325. These push out results are substantially comparable with a ⅝ inch lockbolt and a standard collar and compare favorably to a low profile collar wherein the desired push out strength is 21,700 pounds.

I claim:

1. In combination, a plurality of rigid members having aligned openings, a lockbolt, and a collar, the lockbolt having a preformed head adjacent one of said rigid members, a shank portion connected to the head and extending through the openings and locking grooves formed on the shank and extending beyond the rigid members, said collar positioned on the shank and with an interior defined by a cylindrical first section, and a flared skirt second section extending angularly outward from the first section, said first section and a portion of said second section being in swaged interlocking relationship with said locking grooves so as to form a tight connection of the rigid members between the preformed head and the skirt section.

2. The combination of claim 1 wherein said flared skirt section is of substantially constant wall thickness.

3. The combination of claim 1 wherein said flared skirt extends outwardly at an included angle of approximately 30° to the cylindrical section.

* * * * *